UNITED STATES PATENT OFFICE.

ALBERT L. CLAPP, OF BRAINTREE, MASSACHUSETTS, ASSIGNOR TO HIDE-ITE LEATHER COMPANY, OF BOSTON, MASSACHUSETTS, A CORPORATION OF MAINE.

PROCESS FOR THE PRODUCTION OF STOCK FOR LEATHER-BOARD.

1,033,538. Specification of Letters Patent. Patented July 23, 1912.

No Drawing. Application filed January 4, 1911. Serial No. 600,722.

*To all whom it may concern:*

Be it known that I, ALBERT L. CLAPP, a citizen of the United States, residing at Braintree, in the county of Norfolk and State of Massachusetts, have invented certain new and useful Improvements in Processes for the Production of Stock for Leather-Board, of which the following is a specification.

My present invention pertains to an improved process for the production of stock to be employed in the manufacture of leather-board, and has for its main object the production of a mass or filler which, when mixed with a mass of fibrous leather, will produce a substantially waterproof leather-board which, in addition to being substantially waterproof, will be firm and pliable and possess a body texturally capable of taking and holding a good finish.

The essence of the present invention resides in the employment of a filler produced from cellulose and having therein an insoluble compound which renders the filler substantially waterproof, the constitution of the filler being such that it does not affect the fibrous structure of the leather to which it is added, but merely renders the ultimate board substantially waterproof.

The invention or process is subject to various modifications, but in its simplest form may be said to comprise the following steps: To a body of cellulose (of any kind), say, 400 parts, there is added enough three per cent. solution of hydrochloric or sulfuric acid to cover the cellulose, the mixture of the cellulose and acid preferably taking place in the presence of heat. This produces a thick paste, and to this paste is added chrome salt, preferably bichromate of soda, in the proportion of 400 parts of paste to 100 of bichromate. The reaction between the chrome salt and the acid employed in the production of the hydrocellulose paste results in the formation of an insoluble chromic oxid, which is present throughout the pasty mass. Preferably, the reaction will be effected in the presence of heat, and if the hydrocellulose be not sufficiently acid the deficiency will be supplied by the addition of more acid, the desideratum being to have the bichromate entirely expend itself. The filler thus produced is added to 1200 parts of shredded leather stock, such stock being produced in a beater engine, and independently of the formation of the filler. The addition of the filler to the leather stock, with which it is thoroughly intermixed, has no chemical action or effect upon the stock, the fibers of which retain their elasticity and integrity of structure. The intermixing of the filler and stock has the effect, however, of producing a substantially waterproof board, the hydrocellulose being composed of exceedingly fine, non-fibrous particles which coat the fibers and fill the voids that would be left between the same. The board thus presents a smooth and finished appearance. The filler also aids in producing a relatively large and quick deposit on the felts when run on the wet machine, and, consequently, the board is formed rapidly.

Instead of treating the hydrocellulose in the manner above specified the process may be varied as follows: Convert 300 pounds of any kind of cellulose into hydrocellulose by heating it with a three per cent. solution of hydrochloric or sulfuric acid, and as soon as the reaction is complete add an emulsion compounded from: 50 parts of mineral oil, 75 parts of rosin, 25 parts of fatty acid, such as red oil, 25 parts of soda-ash, with water to render the emulsion sufficiently fluid. This emulsion is mixed in a tank with the hydrocellulose, and a suitable precipitating agent, such as aluminum sulfate, is added, the mixture being thoroughly intermingled. There will be thrown down an insoluble precipitate which, along with the rest of the mass, is dumped into the beater engine and beaten up with the previously disintegrated leather stock. The cellulose, together with the waterproof precipitate and other inherently waterproofing ingredients, fills the interstices between the leather fibers, as well as coats the same, and thus produces a stock which when made into board is substantially waterproof, pliable, firm, and susceptible of taking a fine finish. Various other emulsions may be produced and added to the hydrocellulose, and an insoluble precipitate formed in the mass previous to its being added to and intermixed with the shredded leather.

While I have specified various proportions in the above examples, it will be readily appreciated that these may vary under different working conditions, and the nature of the board it is desired to produce. Again, the chromic oxid may have an effect upon the hydrocellulose, but if any takes place it does not affect the character of the board produced.

Having thus described my invention, what I claim is:

1. The process of forming stock for leather-board, which consists in producing a substantially waterproof filler from hydrocellulose and thoroughly commingling such filler with fibrous leather.

2. The process of forming stock for leather-board, which consists in adding to a body of hydrocellulose an agent capable of forming an insoluble precipitate therein, and finally mixing the mass thus produced with a mass of fibrous leather.

3. The process of forming stock for leather-board, which consists in producing an insoluble precipitate in a mass of hydrocellulose; and finally mixing the body thus produced with a mass of fibrous leather.

4. The process of forming stock for leather-board, which consists in adding to a pasty mass of hydrocellulose a chrome salt, thereby producing an insoluble precipitate therein, and finally mixing the mass thus produced with a mass of fibrous leather.

5. The process of forming stock for leather-board, which consists in adding bichromate of soda to a mass of hydrocellulose, and finally mixing the hydrocellulose thus treated with a mass of fibrous leather.

6. The process of producing stock for leather-board, which consists in neutralizing the acid reaction of a body of hydrocellulose and at the same time forming an insoluble precipitate therein, and finally mixing the mass thus produced with a body of fibrous leather.

7. The process of producing stock for leather-board, which consists in forming a paste from cellulose by treating the same with a three per cent. solution of hydrochloric or sulfuric acid; adding to the paste thus formed bichromate of soda in about the proportions of one part of soda to four of hydrocellulose paste; and finally adding to and mixing with the paste thus treated about twelve hundred parts of leather stock.

8. As a new article of manufacture, leather-board, the body of which is composed of fibrous leather having intermixed therewith a filler produced from hydrocellulose.

9. As a new article of manufacture, leather-board the body of which is composed of fibrous leather, having intermixed therewith a waterproof filler produced from hydrocellulose.

10. As a new article of manufacture, leather-board the body of which is composed of fibrous leather having intimately incorporated therewith chromic oxid and cellulose in the form of finely-divided particles.

11. As a new article of manufacture, leather-board the body of which is composed of fibrous leather having intimately incorporated therewith a filler composed of a waterproof precipitate formed from hydrocellulose and an inherently waterproofing substance.

In testimony whereof I have signed my name to this specification in the presence of two subscribing witnesses.

ALBERT L. CLAPP.

Witnesses:
JULIA M. ENEGESS,
ALEX D. SALINGER.